United States Patent [19]
Sohn

[11] Patent Number: 5,658,621
[45] Date of Patent: Aug. 19, 1997

[54] DEVICE FOR DESIGNING A FLORAL BOUQUET

[75] Inventor: Cleta F. Sohn, Westminster, Colo.

[73] Assignee: Hidden Lake Florist, Inc., Westminster, Colo.

[21] Appl. No.: 364,660

[22] Filed: Dec. 23, 1994

[51] Int. Cl.$^6$ .................................. A01G 5/00; A41G 1/00
[52] U.S. Cl. .................................................. 428/24; 434/93
[58] Field of Search ............................... 428/24, 100, 23; 434/93; 248/27.8

[56] References Cited

U.S. PATENT DOCUMENTS

| | | | |
|---|---|---|---|
| 1,583,505 | 5/1926 | Tilles | 428/26 X |
| 3,137,610 | 6/1964 | Flynn | 428/26 |
| 3,144,932 | 8/1964 | Zerbo, Jr. | 428/24 X |
| 3,316,669 | 5/1967 | Nachbar | 428/100 X |
| 3,553,062 | 1/1971 | Berlin | 428/21 |
| 3,576,699 | 4/1971 | Meyer | 248/27.8 X |
| 3,785,065 | 1/1974 | Kamm | 428/13 X |
| 3,793,126 | 2/1974 | McAdams | 428/24 |
| 4,606,950 | 8/1986 | Corbet | 428/23 |
| 5,162,138 | 11/1992 | Caflisch et al. | 428/17 |
| 5,334,431 | 8/1994 | Longtin | 428/40 |
| 5,453,308 | 9/1995 | Myers | 434/93 X |

*Primary Examiner*—Henry F. Epstein
*Attorney, Agent, or Firm*—Sheridan Ross P.C.

[57] ABSTRACT

The present invention relates to an apparatus and method for designing a floral bouquet. The apparatus includes a substrate having front and back surfaces, and one or more ornamental members having first and second surfaces positionable on the front surface of the substrate. The first and/or second surfaces of the ornamental members may comprise a design feature, such as a flower.

6 Claims, 2 Drawing Sheets

DEVICE FOR DESIGNING A FLORAL BOUQUET

FIELD OF THE INVENTION

This invention generally relates to creating a floral arrangement and, in particular, to a method and apparatus for designing a floral bouquet.

BACKGROUND OF THE INVENTION

Various devices and methods have been previously employed to create or design floral arrangements. For example, U.S. Pat. No. 3,793,126 to McAdams discloses using one or more elongated stem portions and a plurality of petiole or auxiliary stem portions with leaflet shaped pads to construct a bouquet wherein the petiole stem portions are disposed and of a selected number such that they may be positioned to arrange the leaflet shaped pads in a geometric pattern conforming to the floral pattern desired. U.S. Pat. No. 4,606,950 to Corbet discloses a method for assembling a floral arrangement by using a base with a predetermined pattern of holes for insertion of flower stems, wherein each hole is coded to be matched with a flower of a corresponding code.

These available devices and methods for designing a floral arrangement are deficient in several respects. For example, to design a floral arrangement using the apparatus of McAdams disclosed in U.S. Pat. No. 3,793,126, a florist must manipulate, interconnect and/or bend a number of elements, including a number of elongate stem portions and a plurality of petiole stem portions with leaflet pads, and then arrange the leaflet pads in a geometric pattern conforming to the desired floral pattern. Designing a floral arrangement with an apparatus of such complexity can be time consuming and cumbersome, and does not allow the customer to preview the final product until it is completed, often resulting in cost surprises and additional modifications to the bouquet.

The apparatus disclosed in U.S. Pat. No. 4,606,950 to Corbet exhibits similar deficiencies in terms of complexity and time needed to design a floral bouquet. The apparatus and method of Corbet uses a plurality of bases and flower stems with coded numbers to design a floral arrangement. The apparatus can only be used to design flowers in particular settings, that is, the position of flowers within a floral arrangement is dictated by the position of the predetermined holes. In this regard, the apparatus of Corbet is not flexible in terms of design parameters as the predetermined holes provide for only a fixed number of flowers in the floral arrangement at predetermined positions.

None of these devices and methods for creating floral arrangements allow for the design of a floral bouquet with a high degree of flexibility and reproducibility. Furthermore, prior art devices are cumbersome and require manipulation of stem-like members, which is time-consuming. There is therefore a need for a method and apparatus for designing floral arrangements which is inexpensive, easy to use, and flexible such that the position, orientation and/or type of flower within an arrangement can be easily altered and reproduced, facilitating accurate cost estimates for a final product satisfactory to the customer.

SUMMARY OF THE INVENTION

The present invention is directed to an apparatus and method that assists florists in designing floral arrangements in a flexible and cost effective manner. Floral arrangements are often designed months in advance of special occasions and it is often difficult for a customer to discern exactly what the final arrangement will look like and what it will cost to achieve desired visual characteristics. The present invention is capable of recording the designed floral bouquet such that the florist can accurately reproduce the floral bouquet at the initial customer meeting and at an appropriate later time when actual arrangements are produced.

In one embodiment, the present apparatus includes a substrate having front and back surfaces, and one or more ornamental members, each having first and second surfaces. The front surface of the substrate may include a decorative feature which provides a background upon which the floral bouquet may be designed. The first and/or second surfaces of the ornamental members may comprise a design feature.

The present invention can be used to create a suitable floral arrangement. The present invention is capable of allowing a florist and customer to design a floral arrangement quickly and efficiently, as ornamental members comprising design features may be positioned on or about a substrate until the desired floral design is achieved. In particular, the ornamental members may be positioned and repositioned about a surface of the substrate at a number of positions and orientations until a preferred floral bouquet has been designed.

In another embodiment of the present invention, the apparatus includes a supporting means to support the substrate in a substantially upright orientation in order to provide an additional viewing perspective, thus allowing the mock floral arrangement to be viewed from various positions and orientations. In yet another embodiment of the present invention, a holding means is attached to the back surface of the substrate such that the designed floral arrangement may be viewed in various positions and orientations relative to the person holding the apparatus, such as a bride holding a mock bouquet.

In a preferred embodiment of the present invention, the ornamental members releasably engage the front surface of the substrate. To facilitate releasable engagement of the substrate and ornamental members, the ornamental members and substrate should comprise correspondingly engageable materials. In this regard, the present invention contemplates a number of combinations of correspondingly engageable substrates and ornamental members. Such releasable engagement between the substrate and ornamental members is especially beneficial in designing floral bouquets where a supporting and/or holding means is attached to the substrate to orient the substrate in a desired position.

In yet another embodiment, means for binding an edge of each of a series of intermediate sheets is provided to allow for viewing a specific floral arrangement in various settings simply by including a number of decorative features on intermediate sheets.

The apparatus of the present invention may also include an overlaying means to provide a recording medium by which the desired floral arrangement can be preserved for future reference.

DETAILED DESCRIPTION

The present invention relates to designing floral bouquets, such as for bride's and bridesmaids' bouquets, floral centerpieces, nosegays, corsages, and other floral arrangements. Such designs may be created by positioning a number of ornamental members about a surface of a substrate until the desired floral arrangement is designed. More specifically, in a preferred embodiment, one or more ornamental members may be positioned about a front surface of a substrate at selected positions and orientations until a suitable floral arrangement has been created. In one embodiment of the invention, the apparatus may also include a support means to support the substrate in a viewing position, particularly a substantially upright orientation. In addition, another embodiment of the present invention may include a holding means to assist in simulating how the designed floral bouquet will appear in use (e.g., a bride may utilize the holding means to hold the apparatus to about her torso region to show how a designed floral bouquet may appear as she walks down a church aisle). Both the supporting means and/or the holding means may be operatively associated with the substrate. As such, in order to maintain the position and/or orientation of the ornamental members about the substrate, in a preferred embodiment of the present invention, the ornamental members releasably engage the substrate such that the positioned ornamental members remain in the selected position and/or orientation about the substrate even when the substrate is in a substantially upright orientation.

Figure 1:
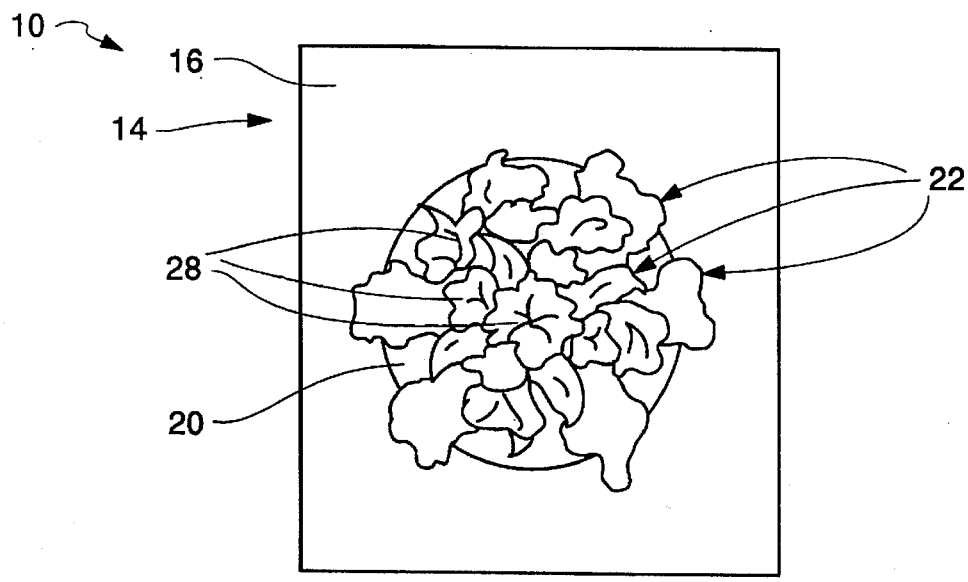
FIG. 1 illustrates a front view of one embodiment of the apparatus of the present invention.
Figure 3A:
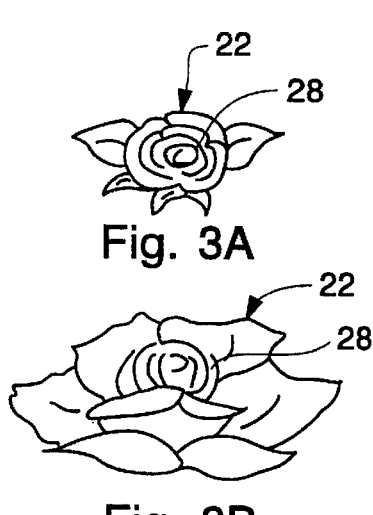
FIGS. 3A–F illustrates a front view of a number of embodiments of ornamental members which can be used in connection with the present invention.
Figure 3B:
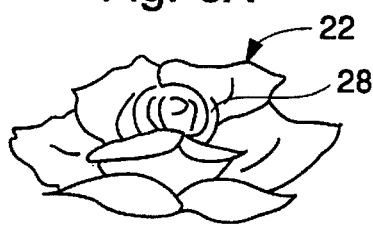
Figure 3C:
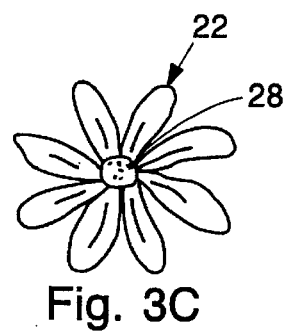
Figure 3D:
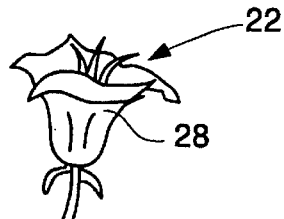
Figure 3E:
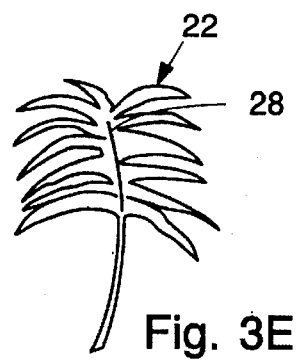
Figure 3F:
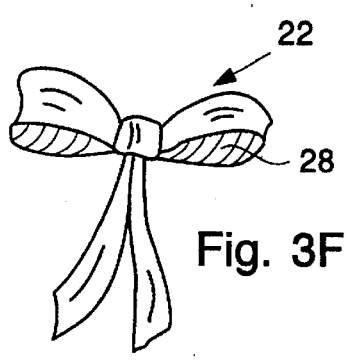
Figure 2:
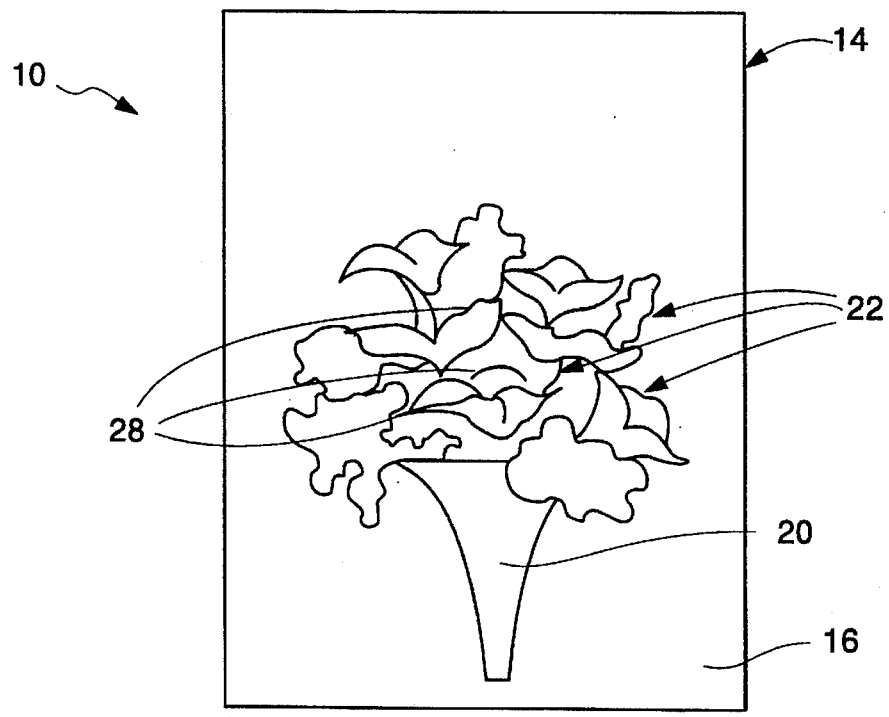
FIG. 2 illustrates a front view of another embodiment of the apparatus of the present invention.
Figures 4, 5:
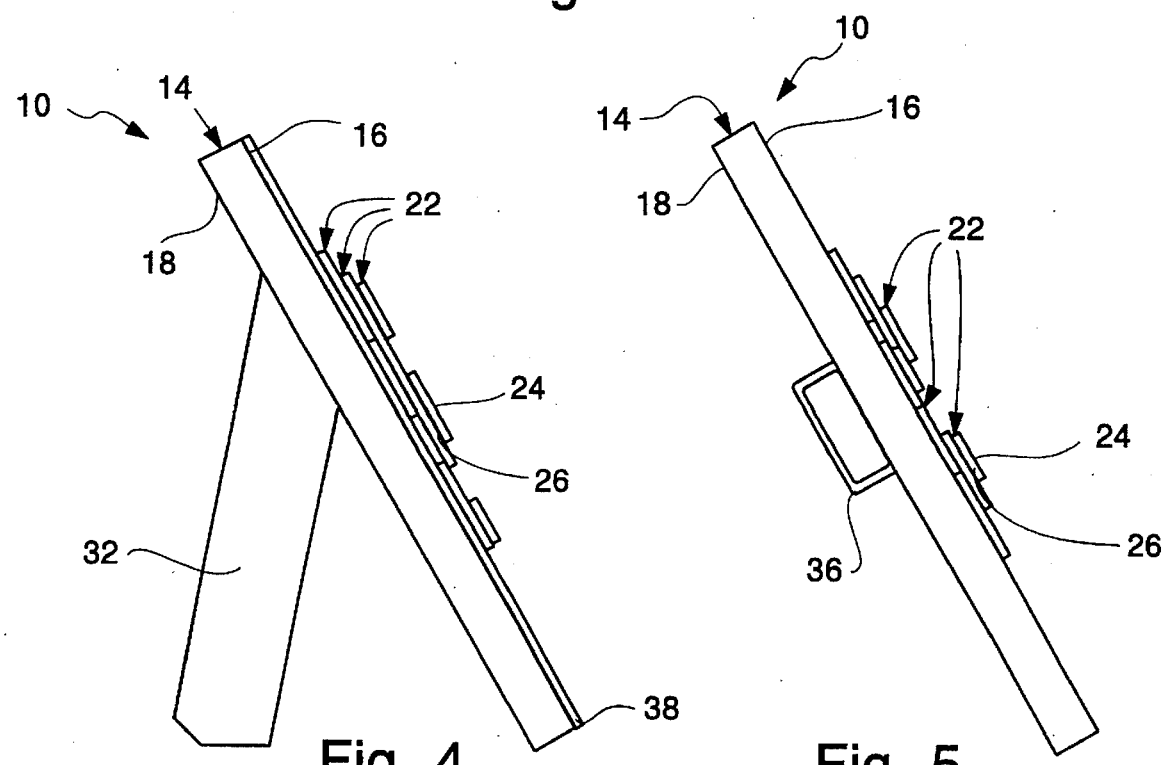
FIG. 4 illustrates a side view of one embodiment of the present invention with a supporting means.
FIG. 5 illustrates a side view of another embodiment of the present invention with a holding means.

As illustrated in FIGS. 1, 2 and 4, the apparatus 10 includes a substrate 14 having front and back surfaces 16, 18. The front and back surfaces 16, 18 may extend longitudinally and may be laterally displaced to provide a front surface 16 upon which one or more ornamental members 22 may be positioned to create a floral bouquet. The shape of the substrate 14 may be altered so as to approximate the shape and/or size of the desired floral bouquet. In this regard, the shape of the substrate 14 may be substantially circular to show or simulate a top view of a floral bouquet. The shape of the substrate 14 may be selected from the group consisting of rectangles, squares, circles, ovals, triangles and other similar shapes. Moreover, the substrate 14 can be flat, curved or of a varied terrain to depict real life floral arrangements.

In order to provide a "background" (i.e., scenery accompanying the flowers), the substrate 14 may include a decorative feature 20, such as a picture of a vase, or, alternatively, the substrate 14 may include one or more colors. For example, in one embodiment of the present invention, the front surface 16 of the substrate 14 includes a green background to simulate flowers surrounded by ferns, vines, leaves, and/or shrubs. The front surface 16 of the substrate 14 may also include other decorative features 20, such as pictures, photographs, paintings or other representations of greenery such as the above-noted ferns to provide a more realistic representation of a floral arrangement's background. Similarly, where, for example, a nosegay is being designed, the decorative feature 20 on the front surface 16 of the substrate 14 may include a picture or photograph of an arm or wrist. In this regard, a floral arrangement (e.g., a nosegay) can be designed in accordance as to how such a nosegay may appear on a woman's wrist.

As illustrated in FIGS. 1–5, the apparatus 10 includes one or more ornamental members 22. The ornamental members 22 have longitudinally extending and laterally displaced first and second surfaces 24, 26 (i.e., front and back surfaces, respectively). In order to design a floral arrangement, the ornamental members 22, specifically the first and/or second surfaces 24, 26 of each ornamental member 22 may include a design feature 28. In this regard, for purposes of flexibility, the design features 28 on the first and second surfaces 24, 26 of the ornamental members 22 may show the same flower, but in different colors. For example, the design feature 28 on the first and second surfaces 24, 26 may comprise a red and yellow rose, respectively. As illustrated in FIG. 3, the design features 28 on the first and/or second surfaces 24, 26 of the ornamental members 22 may be selected from the group consisting of flowers, herbs, vines, shrubs, ferns, leaves, bows, ribbons and other decorative devices.

Furthermore, for purposes of providing a realistic representation of a floral arrangement, the design features 28 on the first and/or second surfaces 24, 26 of the ornamental members 22 may be comprised of pictures (e.g., photographs, paintings, drawings, holographs, etc.) of the flowers, herbs, etc. In order to closely approximate or simulate the actual appearance of finished floral bouquet, the ornamental members 22, and more specifically, the design features 28 of the ornamental members 22 are preferably sized between about 20%–100% of the actual size of the plants and decorative items represented thereon. More preferably, the size of the ornamental members 22 is between about 20%–90% of the actual size of the represented plant or decorative item. In a preferred embodiment of the present invention, the size of the ornamental members 22 is between about 50%–80% of the actual size of the pictured plant or decorative item. This is especially useful where the floral arrangement or bouquet to be designed is a floral centerpiece which utilizes large flowering plants, such as bird-of-paradise flowers or sunflowers.

The apparatus 10 may also include a supporting means 32 to support the substrate 14 in a substantially upright orientation. In this regard, as shown in FIG. 4, the supporting means 32 provides an additional perspective from which the designed floral arrangement may be viewed. Such an orientation is especially useful in designing floral arrangements which will be oriented substantially upright in use, such as floral centerpieces, as shown in FIG. 2. In order to securely support the substrate 14 in a substantially upright orientation, the supporting means 32 may include an easel or, alternatively, may comprise a hanging means (not shown) upon which the substrate 14 may be suspended from a vertical surface, such as a wall. The hanging means may comprise a hook and/or a string or cord which is operatively associated with the substrate 14.

In another embodiment of the present invention, the apparatus 10 may also include a holding means 36, as illustrated in FIG. 5. The function of the holding means 36 is to provide a device by which the apparatus 10 may be grasped by a person. In this regard, by utilizing the holding means 36, the designed floral arrangement may be viewed in the position and/or orientation in which others will view the arrangement. For example, the apparatus 10 may be grasped by the holding means 36 and held substantially about the torso area of a bridesmaid in order to facilitate viewing of the designed floral arrangement as it will appear during a wedding ceremony. In a preferred embodiment, the holding means 36 comprises a handle, as shown in FIG. 4, or, alternatively, may comprise a "knob" or "joy-stick" type of handle. The holding means 36 may be associated with or otherwise attached to the back surface 18 of the substrate 14 to avoid obscuring the ornamental members 22 on the front surface 16 of the substrate 14. In another embodiment of the present invention, the holding means 36 may comprise a pin assembly or an elastic band attached to the back surface 18 of the substrate 14 such that the apparatus 10 may be pinned or otherwise attached to a piece of clothing or a person's limb (e.g., for purposes of designing and viewing a corsage or nosegay).

In order to provide for a cost effective, reproducible and flexible apparatus 10 and method for designing a floral bouquet, especially where a supporting means 32 and/or a holding means 36 is utilized (e.g., the substrate 14 is oriented substantially vertically), the ornamental members 22 preferably releasably engage the front surface 16 of the substrate 14. In this regard, the first and/or second surfaces 24, 26 of the ornamental members 22 may releasably adhere to the front surface 16 of the substrate 14. As such, the ornamental members 22 may be disengaged from and subsequently re-attached to the front surface 16 of the substrate 14 for purposes of repositioning or reorienting the ornamental member 22 about the front surface 16 of the substrate 14. Releasably engageable ornamental members 22 thus provide for a flexible apparatus and method for designing a floral arrangement as the position and orientation of the ornamental members 22 may be altered a number of times during the design process simply by disengaging, repositioning and re-engaging a number of ornamental members 22. This permits a customer to accurately gauge both the visual appearance of the final product and the effect on cost and appearance relating to additions or deletions to a particular design.

In order to provide for releasable engagement of the substrate 14 and the ornamental members 22, the front surface 16 of the substrate 14 and the ornamental member 22 should comprise materials which are capable of releasably engaging one another. In one embodiment of the present invention, the front surface 16 of the substrate 14 may comprise an iron-containing material and the ornamental member 22 may comprise a magnetic material, or vice versa. In another embodiment of the invention, the front surface 16 of the substrate 14 may comprise a material selected from the group consisting of metal, glass and plastic, and the ornamental member 22 may be comprised of a plastic such that the ornamental members 22 are capable of releasably engaging the front surface 16 of the substrate 14 by static electricity. In yet another embodiment of the present invention, the front surface 16 of the substrate 14 may comprise a number of fibers and the ornamental members 22 may comprise mating hooks that can engage the fibers of the substrate. Finally, in another embodiment of the present invention, the front surface 16 of the substrate 14 and the ornamental members 22 may comprise snaps.

In a preferred embodiment, the ornamental members 22 comprise a static-cling material, such as plastic, or, more specifically, polyvinyl chloride. The plastic ornamental members 22 are relatively thin and flexible, having a thickness of less than about 1/50 of an inch. As such, a number of additional ornamental members 22 comprising a plastic static-cling material may overlap one another in releasable engagement. In this regard, portions of ornamental members 22 may overlap one another on the front surface 16 of the substrate 14 to simulate (i.e., provide an appearance of) depth within the floral arrangement design and to provide the florist and customer with a more realistic view of what the floral arrangement will actually look like. Such ornamental members 22 may be die-cut from a thin sheet of plastic static cling material after the design features 28 (e.g., pictures of flowers) have been put on the plastic sheet of static cling material.

In order to facilitate the releasable engagement between the front surface 16 of the substrate 14 and the first and/or second surfaces 24, 26 of the ornamental members 22, an intermediate sheet 38 comprising a thin layer of plastic (i.e., laminate) may be positioned over the front surface 16 of the substrate 14. The intermediate sheet 38 may or may not be fixedly attached to the substrate 14. As illustrated in FIG. 4, the intermediate sheet 38 provides a relatively smooth surface upon which the ornamental members 22 may be positioned and/or releasably attached. As with the front surface 16 of the substrate 14, the intermediate sheet 38 may include a decorative feature 40, such as a vase, or greenery (e.g., ferns, shrubs, vines, leaves).

Where a series of floral bouquets are to be designed, the present invention may also comprise a binding means (not shown) that binds together various substrate surfaces. The binding means is especially useful for designing a series of floral arrangements for a particular occasion (e.g. bride's and bridesmaid's bouquets, reception centerpieces, etc., for a wedding). This would provide the florist with a convenient set of designs from which the bouquets for a particular event can be produced. Also, the binding means is useful for designing a floral arrangement where the specific shape and/or style of the floral arrangement is yet to be decided. For example, a floral arrangement, such as a floral centerpiece, may be viewed against various backgrounds or as setting in vases of varying heights, widths and/or shapes. This may be substantially accomplished according to the present invention by using a binding means. More specifically, a binding means may hold a number of intermediate sheets 38 along an edge of each of the sheets such that the sheets may be "flipped" like pages of a book. The intermediate sheets 38 may, for example, comprise pictures of various vases or scenes of greenery. In this regard, a number of ornamental members 22 may be releasably attached to a clear substrate 14 which may then be positioned over desired intermediate sheets 38 to provide images of the ornamental members 22 in various settings (i.e., vases). The binding means may comprise a three-ring or spiral-type binder device where holes are punched through an edge of each of the intermediate sheets 38 to bind the intermediate sheets 38 together, or, alternatively, the binding means may comprise an adhesive, such as glue, applied to each of the intermediate sheets 38, or pressure-type devices, such as fasteners or clamps. In one embodiment of the present invention, the binding means may be associated with the supporting means 32. In this regard, a supporting means 32 may be attached to or otherwise structurally include a binding means.

In another embodiment of the present invention, the apparatus 10 may also include an overlaying means (not shown) by which the finalized design of the floral bouquet may be preserved and/or recorded. The overlaying means may generally comprise a thin sheet which may be positioned over the substrate 14 and ornamental members 22 to record the position, orientation and/or color of the ornamental members 22 on the substrate 14. More specifically, the overlaying means may comprise a sheet of substantially transparent or translucent material, such as plastic or onion skin paper. Recording the finalized design may be accomplished simply by substantially tracing the outline of each of the ornamental members 22 on or about the substrate 14 and marking each outline with an indication of the desired color (e.g. marking each outline with one or more codes corresponding to each flower and/or color of each flower). Such a feature is especially useful as floral arrangements for weddings, proms or other special events may be designed months prior to the event and, as a result, the present invention assists the florist in recalling the specifics of the desired floral arrangement, such as type, color, orientation and position of flowers. The overlaying means may be attached to the substrate 14 such that the overlaying means may be positioned over the ornamental members 22 and the front surface 16 of the substrate 16. Alternatively, the overlaying means may comprise a separate sheet which can be placed over the ornamental members 22 and the front surface 16 of the substrate 14. The finalized design of the floral bouquet may also be recorded on film (e.g., photograph, videotape).

In use, based upon the specific design feature of the ornamental members 22, one or more ornamental members 22 may be selected for use in designing the floral bouquet. Once a specific ornamental member 22 has been selected, the ornamental member 22 may be positioned on the front surface 16 of the substrate 14 by contacting either the first or second surface 24, 26 of the ornamental member 22 with the front surface 16 of the substrate 14, depending upon whether the design feature 28 of the first or second surface 24, 26 is to be shown. Additional ornamental members 22, with similar or varying design features 28 thereon, may be selected and positioned on the front surface 16 of the substrate 14 in order to create the desired floral bouquet. This is substantially accomplished by contacting one of the first and second surfaces 24, 26 of the ornamental members 22 with the front surface 16 of the substrate 14. Once an ornamental member 22 has been positioned on the front surface 16 of the substrate 14, it may be removed from the front surface 16 of the substrate 14 simply by disengaging the ornamental member 22 from the substrate 14 (e.g., peeling, unsnapping, etc.). Such ornamental members 22 may be repositioned on the substrate 14 by contacting one of the first and second surfaces 24, 26 of the ornamental member 22 with the front surface 16 of the substrate 14 and/or with the remaining engaged ornamental members 22 positioned on the front surface 16 of the substrate 14. In this regard, ornamental members 22 may be placed in overlapping relation with one another to provide an appearance of depth to the floral bouquet. Positioning the ornamental members 22 about the front surface 16 of the substrate 14 may be repeated a number of times for each ornamental member 22 until the desired position and/or orientation of the ornamental members 22 has been achieved.

In one embodiment of the present invention, the above-noted procedure for designing a floral bouquet may be conducted while the substrate 14 is supported in a substantially upright orientation by the supporting means 32 or holding means 36 as the ornamental members 22 may releasably engage the front surface 16 of the substrate 14. In this regard, releasably engageable ornamental members 22 may be positioned about the front surface 16 of the substrate 14 while the substrate 14 is substantially vertically oriented. Preferably, releasably engageable ornamental member 22 may overlap one another while the substrate 14 is substantially vertically oriented.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A device for designing a floral bouquet having a plurality of floral elements, said device comprising:

a substrate having a front surface comprising a material selected from the group consisting of metal, glass and plastic, said front surface having a plurality of locations thereon and having a decorative feature depicting a background for said floral bouquet;

a plurality of ornamental members comprising first and second surfaces, each of said first surfaces having a design feature and said second surfaces being suitable for contacting said front surface of said substrate, said design features of said ornamental members being selected from the floral element group consisting of flowers, herbs, vines, shrubs, ferns and leaves, a plurality of said ornamental members being provided corresponding to each said selected group to provide flexibility in choosing said floral elements of said design features of said ornamental members to design said floral bouquet, each of said second surfaces of said ornamental members being releasably engageable with said front surface of said substrate at any selected one of said locations on said front surface to permit said ornamental members having said chosen floral elements to repeatedly engage with and disengage from any said selected location until a desired design of said floral bouquet is achieved; and at least one decorative member, said at least one decorative member comprising a decorative surface and a second releasably engageable surface, each said decorative surface of each of said at least one decorative member being selected from the group consisting of bows and ribbons, said second releasably engageable surface being repeatedly engageable with and disengageable from any of said locations on said front surface until said at least one decorative member having said selected decorative surface is located within said floral design.

2. A device as claimed in claim 1, wherein each of said second surfaces of said plurality of said ornamental members is made from material capable of releasably engaging said front surface of said substrate by static electricity.

3. A device as claimed in claim 1, wherein said front surface of said substrate and said second surfaces of each of said plurality of said ornamental members comprise snaps.

4. A device as claimed in claim 1, said device further comprising:

said substrate having a back surface; and a support mounted on said back surface of said substrate for holding said substrate in a position for viewing said floral bouquet.

5. A device as claimed in claim 1, wherein each of said plurality of ornamental members has a size of between about 20% to about 100% of the actual size of said floral element represented by said design feature.

6. A device for designing a floral bouquet having a plurality of floral elements, said device comprising:

a substrate having a front surface comprising plastic material and having a decorative feature depicting a background for said floral bouquet, said front surface having a plurality of locations thereon; and a plurality of ornamental members comprising first and second surfaces, each of said first surfaces having a design feature and each of said second surfaces being made from plastic material for contacting said front surface of said substrate, said design features of said ornamental members depicting different types of flowers, a plurality of said ornamental members being provided corresponding to a particular type of flower to provide flexibility in the selection of flowers to be depicted in the design of said floral bouquet, each of said second surfaces of said ornamental members being releasably engageable by static electricity with any of said locations of said front surface of said substrate that are selected to permit said ornamental members having said design features depicting selected flowers to repeatedly engage with and disengage from any of said selected locations until a desired design of said floral bouquet is achieved.

* * * * *